US011494516B2

(12) United States Patent
Lukas (10) Patent No.: US 11,494,516 B2
(45) Date of Patent: Nov. 8, 2022

(54) COGNITIVE INTERFACE PRIVACY MANAGEMENT

(71) Applicant: Aetna Inc., Hartford, CT (US)

(72) Inventor: Raymond Lukas, Maynard, MA (US)

(73) Assignee: Aetna Inc., Hartford, CT (US)

( * ) Notice: Subject to any disclaimer, the term of this patent is extended or adjusted under 35 U.S.C. 154(b) by 277 days.

(21) Appl. No.: 16/806,465

(22) Filed: Mar. 2, 2020

(65) Prior Publication Data

US 2021/0271775 A1 Sep. 2, 2021

(51) Int. Cl.
*G06F 21/62* (2013.01)
*G06F 16/903* (2019.01)
*H04L 51/066* (2022.01)

(52) U.S. Cl.
CPC ........ *G06F 21/6263* (2013.01); *G06F 16/903* (2019.01); *H04L 51/066* (2013.01)

(58) Field of Classification Search
CPC .... G06F 21/6263; G06F 16/903; G06F 21/42; G06F 21/6245; G06F 21/84; H04L 51/066; H04L 63/18; H04L 51/046; H04L 51/02; H04L 51/20; H04W 12/02
See application file for complete search history.

(56) References Cited

U.S. PATENT DOCUMENTS

| | | | |
|---|---|---|---|
| 10,387,417 B1* | 8/2019 | Hansen | G06Q 50/01 |
| 2006/0004674 A1* | 1/2006 | Tesser | H04L 63/0428 |
| | | | 705/74 |
| 2009/0275289 A1* | 11/2009 | Good | H04W 16/18 |
| | | | 455/67.11 |
| 2015/0312259 A1* | 10/2015 | Alpha | G06F 16/951 |
| | | | 707/723 |
| 2016/0330172 A1* | 11/2016 | Muttik | G06F 21/6245 |
| 2017/0185808 A1* | 6/2017 | Zhang | H04M 1/7243 |
| 2018/0302478 A1* | 10/2018 | Clediere | H04L 67/535 |
| 2020/0099532 A1* | 3/2020 | Goldman | H04L 9/3247 |

* cited by examiner

*Primary Examiner* — Harunur Rashid
(74) *Attorney, Agent, or Firm* — Leydig, Voit & Mayer, Ltd.

(57) ABSTRACT

Systems and methods for providing independent situational awareness messages are provided. The method includes receiving, by a rendering engine, a request for information from an input interface. The rendering engine queries at least one data store in response to the request. The rendering engine obtains public content data and private content data from the data store. The rendering engine transmits the public content data over a public output interface. The rendering engine transmits the private content data over a private output interface.

8 Claims, 7 Drawing Sheets

COGNITIVE INTERFACE PRIVACY MANAGEMENT

BACKGROUND OF THE INVENTION

Individuals increasingly obtain health related information from automated sources. For example, an individual may request health information from a web browser, voice assistant, phone system, text messaging system, and other means. However, it is important to maintain confidentiality of health information. Private health information should not be shared publicly by an automated system.

Some of the sources an individual uses to request health information may be accessed in private. For example, an individual may request health information from their own computer, in their own home, using a web browser. In some instances, the requests may be public. For example, an individual may request health information using a voice assistant. The voice assistant could then announce the requested health information. In this example, anyone nearby may hear the announcement containing the health information.

Thus, if a request is made for private health information using a public source, private health information may be inadvertently shared publicly.

BRIEF SUMMARY OF THE INVENTION

In one embodiment, a method for providing independent situational awareness messages is provided. The method includes receiving, by a rendering engine, a request for information from an input interface. The rendering engine queries at least one data store in response to the request. The rendering engine obtains public content data and private content data from the data store. The rendering engine transmits the public content data over a public output interface. The rendering engine transmits the private content data over a private output interface.

In another embodiment, a rendering server is provided. The server includes a processor and a non-transitory computer readable memory storing instructions that when executed by the processor cause the rendering server to perform the steps. The steps include receiving, by a rendering engine, a request for information from an input interface. The rendering engine queries at least one data store in response to the request. The rendering engine obtains public content data and private content data from the data store. The rendering engine transmits the public content data over a public output interface. The rendering engine transmits the private content data over a private output interface.

In yet another embodiment, a non-transitory computer readable memory storing instructions that when executed by a processor cause the processor to perform steps is provided. The steps include receiving, by a rendering engine, a request for information from an input interface. The rendering engine queries at least one data store in response to the request. The rendering engine obtains public content data and private content data from the data store. The rendering engine transmits the public content data over a public output interface. The rendering engine transmits the private content data over a private output interface.

DETAILED DESCRIPTION OF THE INVENTION

Health information is requested in both private and public environments. Embodiments provide a conversational (cognitive) interface that can present private personal information in a variety of environments, including in a public setting. In many instances, an individual may request private information in an environment or channel that may make that information public. Therefore, the system intelligently responds by providing information using an appropriate private channel when necessary. An entire repository of information, including health information, both private and public, can be shared through a single conversational interface request.

Embodiments are sensitive to an individual's surroundings and environment. Through geo-location, direct query, internet address, or other means, the system can determine an individual's location and present sensitive information through an appropriate channel. Embodiments provide a cognitive interface that responds through the appropriate engagement channel (voice through voice, web through web, etc.) for a particular individual's location.

In one embodiment, responses may contain augmentations quick response codes (QR codes), web addresses or other means for accessing relevant products, helpful web pages and other information. A preference engine may allow an individual to opt into receiving the additional information. The preference engine may also hold contact and channel preferences for both individuals and their health providers. The preferences may include who should be notified and through what channel for a given situation.

Figure 1:
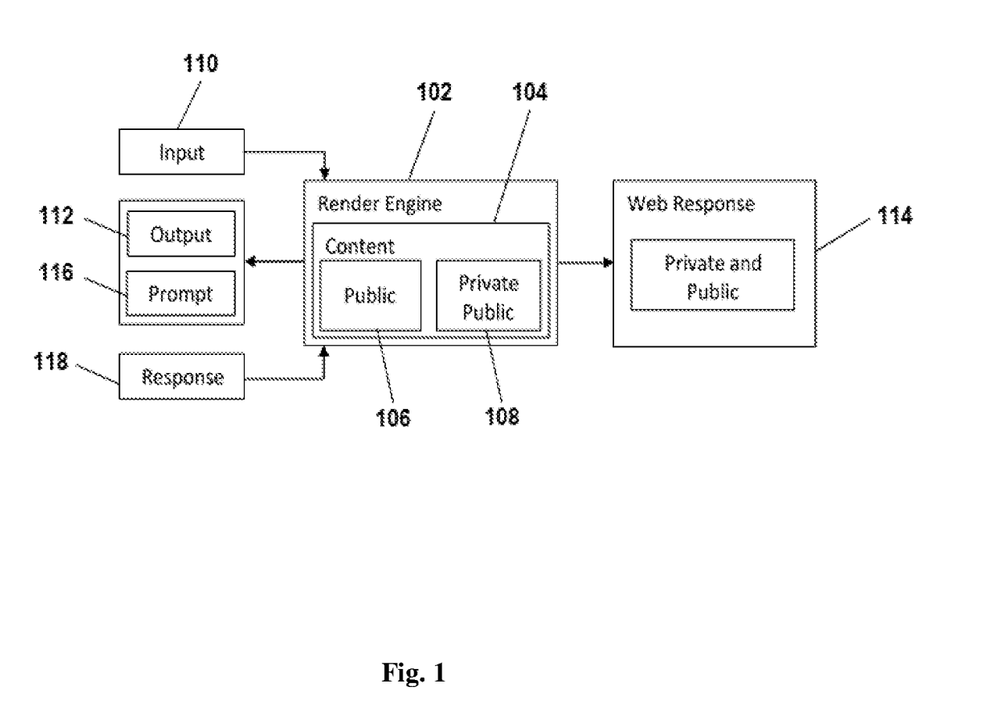
FIG. 1 provides a system diagram of a cognitive interface privacy system according to an embodiment.

FIG. 1 provides a system diagram of a cognitive interface privacy system according to an embodiment. The render engine 102 allows private, integrated information, to be shared safely in both private and non-private settings. The content component 104 can determine whether certain information is public information 106 or contains private information 108. Private information 108 may contain both public and private information. However, the system will treat information as private if it contains at least some private content.

The system cognitive (conversational) interfaces across a wide spectrum of devices. Therefore, input 110 to the render engine can come from a web browser, voice assistant, phone system, text messaging system, and other means. The render engine 102 can then output public information 106 through a public channel 112. The render engine 102 can output private information 108 through a private channel 114, such as a web interface. As noted above, the private channel 114 may output both private information and public information.

In some embodiments, the rendering engine 102 may also augment responses with additional information. For example, if a voice input is used, a voice print may be used to match the request with an individual. Matching a voice print to an individual allows the system to augment personal information into generated responses. As an example, the render engine 102 could augment responses with relevant product information. QR codes may be used to provide in-store or online information. Store details and location, as well as other useful information can be added into responses by the render engine 102. For example, if an individual requests information about a new prescription, the render engine 102, may provide the information, but also provide information about the pharmacy the prescription can be picked up from and its hours.

The rendering engine 102, through a preference setting, may determine whom responses should be sent to under certain conditions. In some embodiments, medical staff involved in a patient's care may also set preferences. For example, if a certain patient requests information on chest pain, the patient's cardiologist may request to be notified, with the patient's consent.

In some cases, the rendering engine 102 may request additional information using a prompt 116. For example, the rendering engine 102 may request information about a user's location. In some cases, the location can be obtained automatically from a GPS device or a user device IP address. If the location cannot be determined, the system may prompt the user for location information. Additionally, the rendering engine may request additional information to confirm a user's identity. The user can then provide a response 118 to the rendering engine 102 prompt 116.

Figure 2:
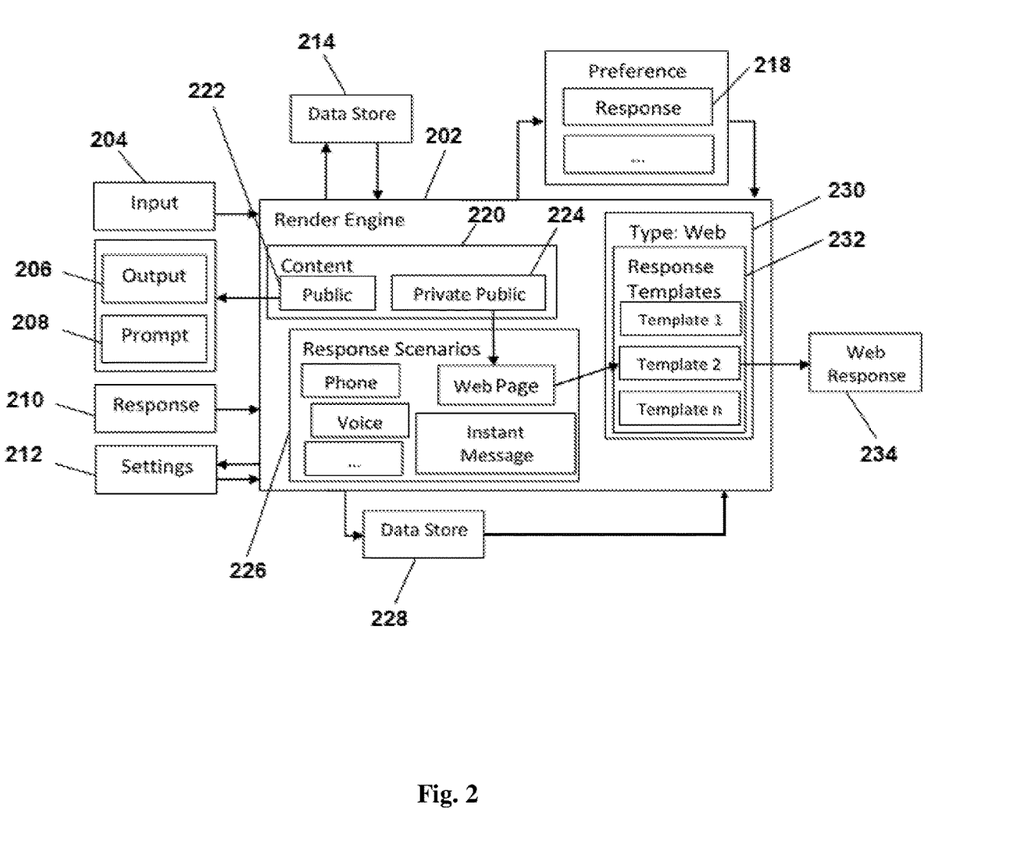
FIG. 2 provides components of the system diagram of a cognitive interface privacy system show in FIG. 1, according to some embodiments.

FIG. 2 provides components of the system diagram of a cognitive interface privacy system show in FIG. 1, according to some embodiments. The render engine 202 receives input 204 through an interface, such as a voice interface. The input may be a request, such as "When is my next doctor appointment?" The render engine 202 may request additional information from the user. For example, the render engine 202 may inquirer, through output interface 206 whether the user would like details regarding the appointment, some of which may be private. The user may then respond to the prompt 208 by providing a response 210. In one example, when private information is requested, the rendering engine 202 may queries, through output interface 206, the user about their current environment. The user can then provide a response 210 describing their current environment. If privacy is not assured, the rendering engine can initiate private processing. While a public channel can only render public information, a private channel can render both public and private information. The rendering engine 202, through preset preferences or settings 212, can render responses through a variety of channels based on user preference.

After receiving a request, the render engine 202 may obtain data from one or more data stores 214. For example, the render engine 202 may obtain the time and location of a user's next doctor appoint from the data store 214. The data store 214 may contain all known information about a user. Information such as doctor visits, medication, medical history, address, and other personal information may be in the data store.

The render engine 202 may then obtain preferences from a preference engine 216. The preference engine 216 may save preferences and settings 212. The preference engine 216 is used, for example to customize the render engine 202 behavior. As described below, there are several layers of customizations which can be set. In one embodiment, the preference engine 216 saves various responses 218 to prompts 208. The saved responses 218 may be the responses 210 transmitted by a user.

The content component 220 can determine whether certain information is public information 222 or contains private information 224. In some embodiments, the content component 220 may determine whether information is private based on pre-coded private categories of information. For example, medical history and social security number may be pre-coded in the content component 220 as private information. In some instances, legal guardians and others may have access to information that is normally private information from another individual. Additionally, in some instances a user may grant permission for another person, such as a spouse, to receive their private information.

Private information 108 may contain both public and private information. The response scenarios 226 contain the details of various channels to which responses can be dispatched. Example response channels include phone, voice assistant, web page, instant messenger and others. An additional information data store 228 stores product information, general medical information, store details, such as location and open hours, and other information that may be useful to a user.

For a selected output channel, various templates exist. For example, for output channel web, numerous templates 232 are saved. Each response scenario can have multiple templates which can be selected to overlay both public and private data into. These templates 232 also vary the responses a user may receive. The template provides a form that information can be plugged into. For example, an input such as "When is my next doctor appointment?" may be associated with a web page response based on a user's preferences saved in the preference engine 218. The template may include text such as "Your next appointment is on XXX." In this example, XXX is a blank that can be completed with the date and time of the next appointment. In this example, the requested information is then provided through web response 234 or through a voice assistant. In this example, the transmitted information may be sent over a public output channel. In another example, the template may include text such as "Your next appointment for YYY is on XXX." In this example, the YYY field may be completed with private information, such as "a heart procedure." In this example, the response includes private information and will be transmitted over a private output channel. Alternatively, the non-private portion of the response may be transmitted over a potentially public channel such as a voice assistant and the user may also receive a notification or prompt to check their private output channel for additional information.

Similar flows and templates can be provided for other output channels, such as phone, voice assistant, instant messenger and others.

In one embodiment, a user provides an input 204 through a voice assistant. The user identity is determined from the incoming voice print. The rendering engine 202 through the preference engine settings 218 understands the desired response scenarios 226, as well as other customizations. These preferences allow the render engine 202 to query the external data stores 214 and services to generate a complete, compliant response through the desired and appropriate output channel.

One of the features of the rendering engine 202 is the ability to augment responses with additional information. Generating a response is first done by selecting the response scenario 226. In the illustrated example, a web page response scenario is selected. Depending on the request type and preference settings, a template 232 is selected and overlaid with client details and additional information from the additional information data store 228 to create the completed response 234. The completed response is transmitted to the user using the appropriate response channel.

Figure 3:
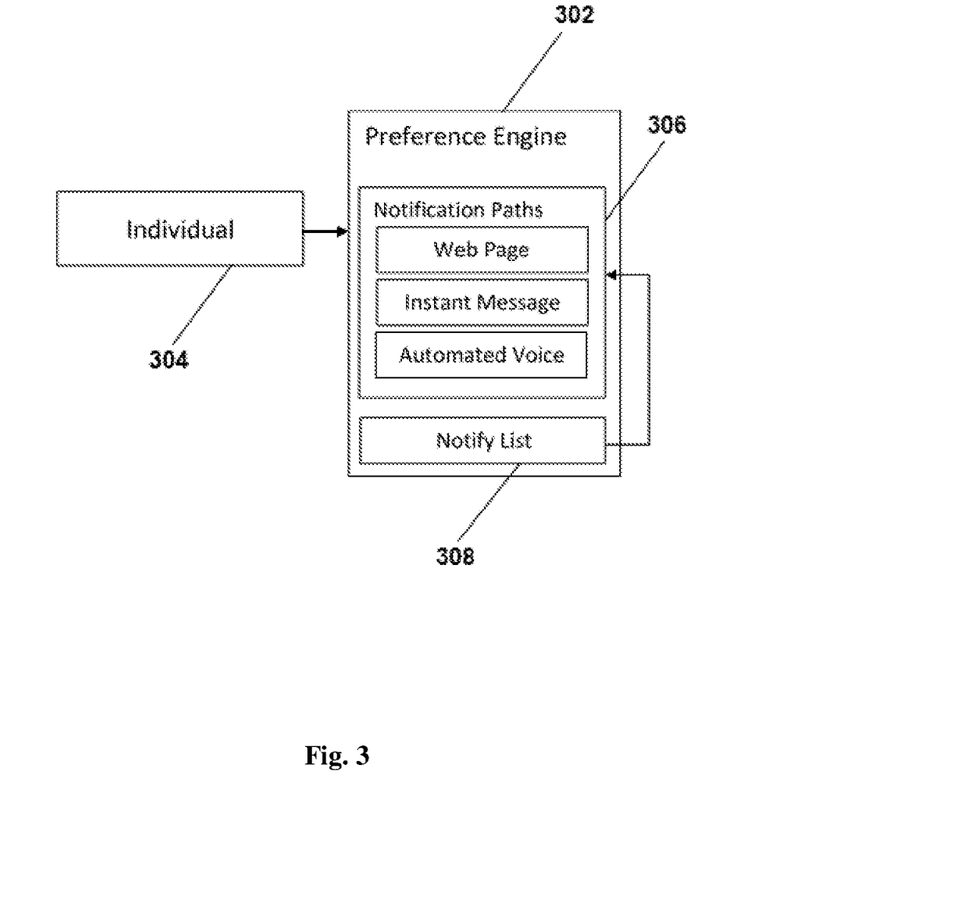
FIG. 3 illustrates components of a preference engine according to some embodiments.

FIG. 3 illustrates components of a preference engine according to some embodiments. The preference engine 302 stores user preferences. A user facing interface 304 allows an individual to set preferences. A user may set, for example, preferred notification paths or output channels 306. The user may also set a list of individuals 308 to receive responses. In some embodiments, a medical professional or others may be able to override, temporarily or permanently, a user's preferences. In one example, a physician may override a patient's preference for the type of notification from instant message to a request to contact the physician to discuss results, etc.

In some embodiments, the preference engine 302 may also be used to create and implement notification lists 308. For example, some individuals may need to have notifications sent to guardians, or others. In addition, an individual may wish to also notify other family members such as spouses or elders may choose to notify their caretakers.

Preferences may also be used to customize additional information provided with a response. For example, affiliate related information may be included in a generated response. Various preferences can be saved. Regulatory mandated preferences include global preferences implemented for all users of a community (minors for example). User and guardian preferences include preferences unique to and under the control of users. Third party preferences may include preferences for outside entities, including clinical personnel, or third-party affiliates wishing to customize how additional content is included into the generated responses.

Figure 4:
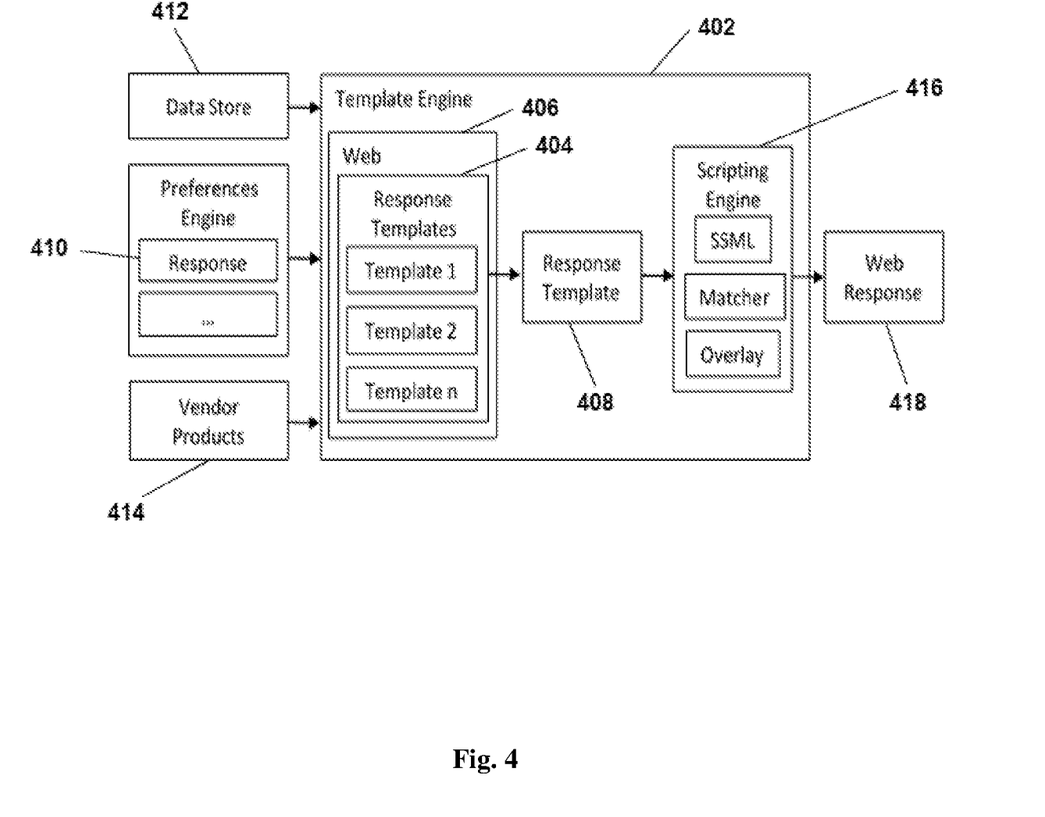
FIG. 4 illustrates components of a template engine according to some embodiments.

FIG. 4 illustrates components of a template engine according to some embodiments. The template engine 402 stores various templates 404 for each output channel 406. For example, a voice assistant includes conversational interfaces that will perform the natural language generation for verbal responses. The template engine 402 includes a template 404 for each response scenario. As described above, a template is a form that unique information can be added to in order to provide a response to a request. In one embodiment, the template engine 402 uses a response template 408, selected by preference settings 410 for a web response scenario. Into this template will be overlaid values from a data store 412 and the additional data from a additional data store 414, such as vendor product data. A scripting engine 416 provides a response using, for example, SSML (Speech Synthesis Markup Language), a matcher to match the data into the template and an overlayer to provide both public and private data into the template. A response 418 is then provided using the appropriate output channel.

Figure 5:
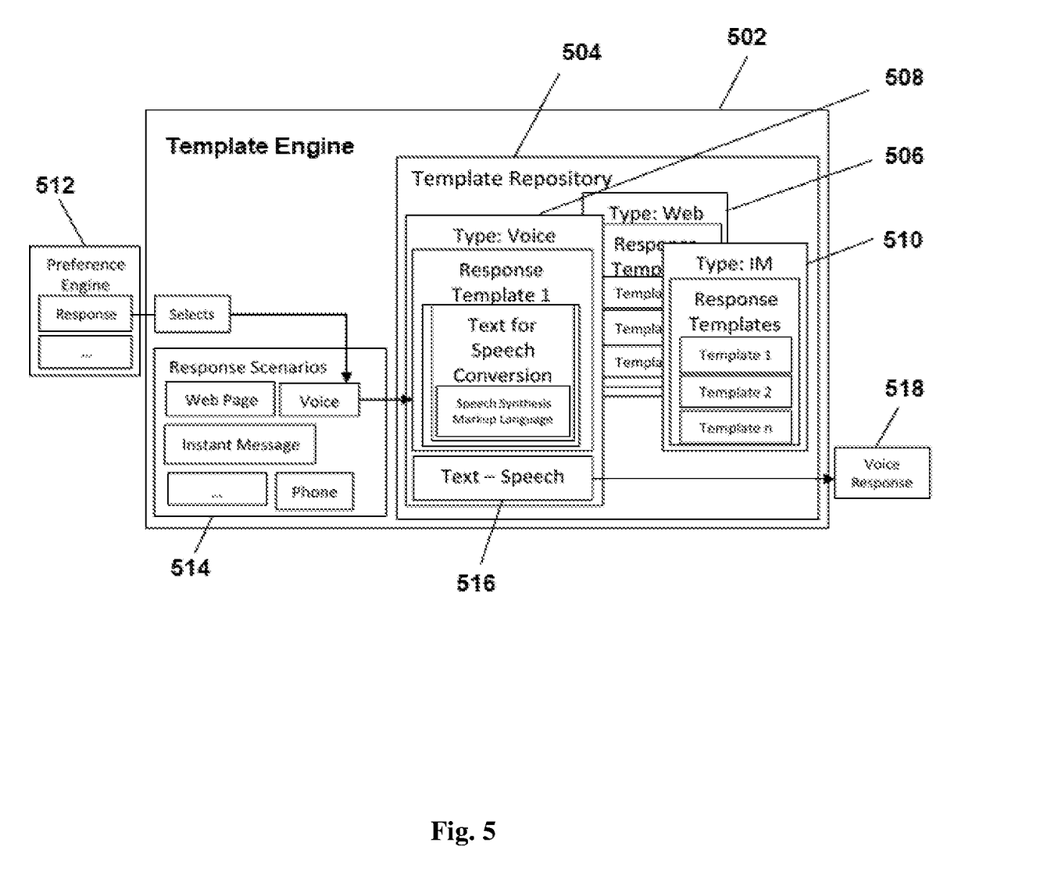
FIG. 5 illustrates components of a template engine according to some embodiments.

FIG. 5 illustrates components of a template engine according to some embodiments. The template engine 502 includes a template repository 504. Various scenarios require different template types, such as web 506, voice 508, and instant message 510. Each template type includes various templates for responding to requests. The template engine 502 not only manages templates in the template repository 504, but also abstracts the underlying technologies to convert these templates into usable, returnable responses. As described above, a preference engine 512 is used to select a desired output channel or response scenario 514.

In one example, a web template may contain HTML, and JavaScript for proper alignment of content on a webpage. As described above, the template further includes text to aid in responding to human interaction. A voice template may contain text augmented with SSML (Speech Synthesis Markup Language) for proper conversion into speech audio. In this way, a text to speech engine 516 converts a template and data to speech and a voice response 518 may be provided. In this embodiment, each response scenario may map to a different repository of templates and rendering mechanisms.

Figure 6:
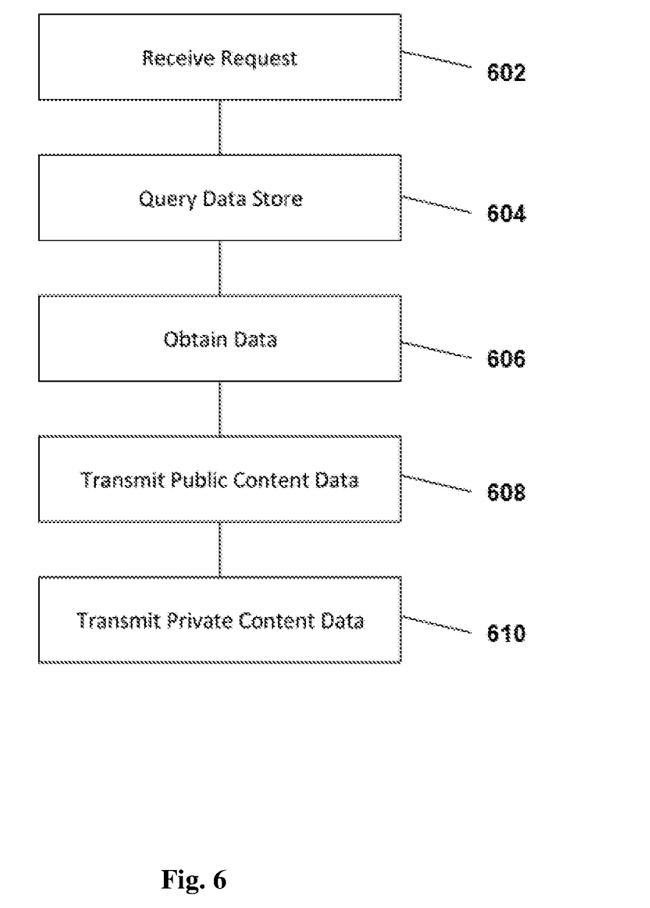
FIG. 6 provides a flow diagram illustrating a process for providing public content and private content according to some embodiments.

FIG. 6 provides a flow diagram illustrating a process for providing public content and private content according to some embodiments. The illustrated process includes providing independent situational awareness messages. The messages may be in the form of the responses described above and may be transmitted through a variety of output channels. At step 602, a rendering engine receives a request for information from an input interface. At step 604, the rendering engine queries at least one data store in response to the request. At step 606, the rendering engine obtains public content data and private content data from the data store. As described above, the rendering engine formats the public content data using a template for the public output interface and formats the private content data using a template for the private output interface. The templates may be selected from a plurality of private interface templates based on the private content data.

At step 608, the rendering engine transmits the public content data over a public output interface. In some embodiments, the rendering engine provides a prompt over the public output interface, indicating that private content data is responsive to the request for information and receives a request to transmit the private content data over a private output interface. In this way a user knows to also check a private output interface. At step 610, the rendering engine transmits the private content data over a private output interface. The rendering engine may select the private output interface from a plurality of private output interfaces based on a preference setting. As described above, the rendering engine may also transmit the public content data over the private output interface.

Figure 7:
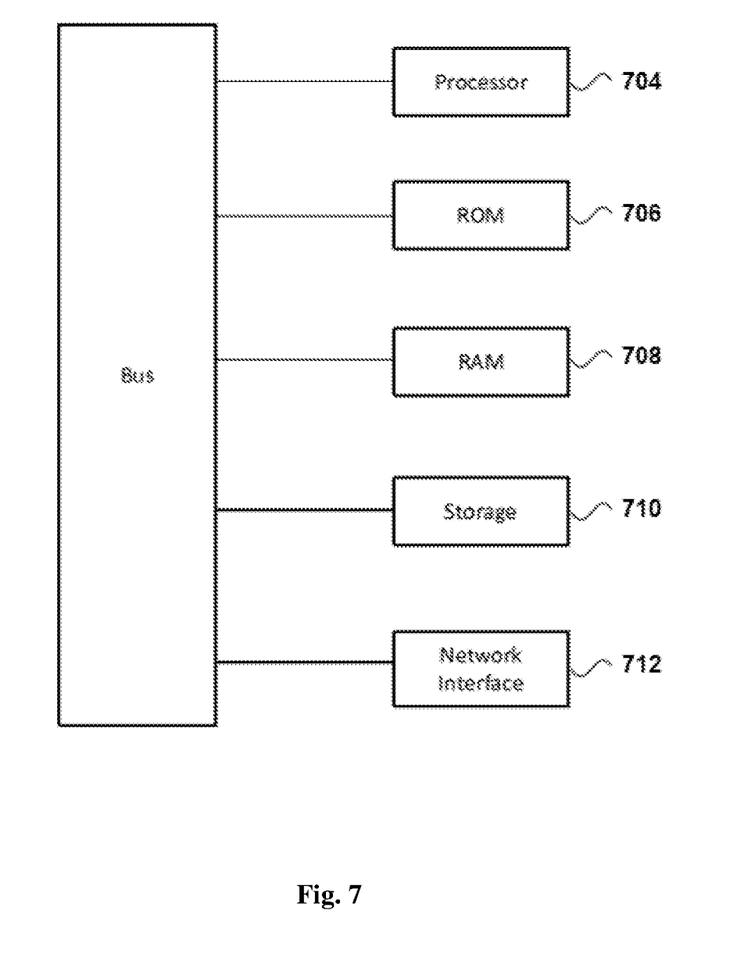
FIG. 7 illustrates a computing device according to some embodiments.

FIG. 7 illustrates a computing device according to some embodiments. The computing device can be used to implement the render engine, computer stores and other devices described above. The computing device includes a processor 704, such as a central processing unit (CPU), executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network, wireless network or cellular network and to a local area network or wide area network, such as the internet.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for providing independent situational awareness messages, the method comprising:
    receiving, by a rendering engine, a request for information from an input interface;
    querying, by the rendering engine, at least one data store in response to the request;
    obtaining, by the rendering engine, data from at least one data store, wherein the data comprises public content data and private content data;
    in response to obtaining private content data, providing a prompt indicating that private content data is responsive to the request for information;
    receiving a request to transmit the private content data over a private output interface;
    formatting the public content data using a template for the public output interface;
    formatting the private content data using a template for the private output interface;
    selecting the template for the private output interface from a plurality of private interface templates based on the private content data;
    selecting the private output interface from a plurality of private output interfaces based on a preference setting;
    transmitting, by the rendering engine, the public content data over a public output interface; and
    transmitting, by the rendering engine, the private content data over the private output interface.

2. The method of claim 1 wherein the plurality of private output interfaces include at least one of a web interface, an instant message interface, and an automated voice interface.

3. The method of claim 1 further comprising transmitting, by the rendering engine, the public content data over the private output interface.

4. A rendering server comprising:
    a processor; and
    a non-transitory computer readable memory storing instructions that when executed by the processor cause the rendering server to perform the steps comprising:
        receiving, by a rendering engine, a request for information from an input interface;
        querying, by the rendering engine, at least one data store in response to the request;
        obtaining, by the rendering engine, data from at least one data store, wherein the data comprises public content data and private content data;
        in response to obtaining private content data, providing a prompt indicating that private content data is responsive to the request for information;
        receiving a request to transmit the private content data over a private output interface;
    formatting the public content data using a template for the public output interface;
    formatting the private content data using a template for the private output interface;
    selecting the template for the private output interface from a plurality of private interface templates based on the private content data;
        selecting the private output interface from a plurality of private output interfaces based on a preference setting;
        transmitting, by the rendering engine, the public content data over a public output interface; and
        transmitting, by the rendering engine, the private content data over the private output interface.

5. The server of claim 4 wherein the plurality of private output interfaces include at least one of a web interface, an instant message interface, and an automated voice interface.

6. The server of claim 4, the steps further comprising transmitting, by the rendering engine, the public content data over the private output interface.

7. A non-transitory computer readable memory storing instructions that when executed by a processor cause the processor to perform steps comprising:
    receiving, by a rendering engine, a request for information from an input interface;
    querying, by the rendering engine, at least one data store in response to the request;
    obtaining, by the rendering engine, data from at least one data store, wherein the data comprises public content data and private content data;
    in response to obtaining private content data, providing a prompt indicating that private content data is responsive to the request for information;
    receiving a request to transmit the private content data over a private output interface;
    formatting the public content data using a template for the public output interface;
    formatting the private content data using a template for the private output interface;
    selecting the template for the private output interface from a plurality of private interface templates based on the private content data;

selecting the private output interface from a plurality of private output interfaces based on a preference setting;

transmitting, by the rendering engine, the public content data over the public output interface; and transmitting, by the rendering engine, the private content data over a private output interface.

8. The non-transitory computer readable memory of claim 7 wherein the plurality of private output interfaces include at least one of a web interface, an instant message interface, and an automated voice interface.

\* \* \* \* \*